United States Patent
Lew

(10) Patent No.: US 12,269,749 B2
(45) Date of Patent: Apr. 8, 2025

(54) SYNTHESIS OF ALUMINUM-CONTAINING MOLECULAR SIEVE SSZ-60

(71) Applicant: CHEVRON U.S.A. INC., San Ramon, CA (US)

(72) Inventor: Christopher Michael Lew, Alameda, CA (US)

(*) Notice: Subject to any disclaimer, the term of this patent is extended or adjusted under 35 U.S.C. 154(b) by 345 days.

(21) Appl. No.: 17/964,981

(22) Filed: Oct. 13, 2022

(65) Prior Publication Data

US 2024/0140811 A1    May 2, 2024

(51) Int. Cl.
    C01B 39/24    (2006.01)
    C01B 39/04    (2006.01)

(52) U.S. Cl.
    CPC .............. *C01B 39/24* (2013.01); *C01B 39/04* (2013.01)

(58) Field of Classification Search
    CPC ................................ C01B 39/04; C01B 39/24
    See application file for complete search history.

(56) References Cited

U.S. PATENT DOCUMENTS 6,468,485 B1    10/2002    Elomari
6,540,906 B1     4/2003    Elomari
6,620,401 B1 *   9/2003    Elomari ............. B01D 53/8628
                                                      423/706

FOREIGN PATENT DOCUMENTS

EP    3191402 A1    7/2017

OTHER PUBLICATIONS

PCT International Search Report, International Appl. No. PCT/US2023/076924, mailed Feb. 8, 2024.
H. Naiki, K. Komura, J-H. Kim, G. Seo and Y. Sugi "SSZ-60: Synthetic investigation and catalytic application to the alkylation of biphenyl and naphthalene" Micropor. Mesopor. Mater. 2011, 143, 383-391.
A. Burton and S. Elomari "SSZ-60: a new large-pore zeolite related to ZSM-23" Chem. Commun. 2004, 2618-2619.
S. Smeets, L.B. Mccusker, C. Baerlocher, S. Elomari, D. Xie and S.I. Zones "Locating Organic Guests in Inorganic Host Materials from X-ray Powder Diffraction Data" J. Am. Chem. Soc. 2016, 138, 7099-7106.

* cited by examiner

*Primary Examiner* — Anthony J Zimmer
*Assistant Examiner* — Annette Phan

(57) ABSTRACT

A method for preparing an aluminosilicate molecular sieve having the SSY framework structure is described. The method includes (1) a step of preparing a reaction mixture containing an aluminosilicate zeolite having an FAU framework type; N-ethyl-N-(3,3,5-trimethylcyclohexyl)pyrrolidinium cations and/or N-ethyl-N-(2,4,4-trimethylcyclopentyl)pyrrolidinium cations; an alkali metal; hydroxide ions; seed crystals; and water; and (2) a step of subjecting the reaction mixture to crystallization conditions sufficient to form crystals of the aluminosilicate molecular sieve. The resulting molecular sieves are useful as catalysts, particularly when used in combination with exchanged transition metal(s).

8 Claims, 3 Drawing Sheets

SYNTHESIS OF ALUMINUM-CONTAINING MOLECULAR SIEVE SSZ-60

FIELD

This disclosure relates to the synthesis of crystalline aluminosilicate molecular sieves having an SSY framework structure, such as SSZ-60.

BACKGROUND

Molecular sieves are a family of porous materials having a regular inorganic framework structure with a plurality of pores or channels of set size that are defined therein. The pore or channel size varies for different molecular sieves and determines the breadth of molecules that may enter the interior of a particular molecular sieve. Because of their microporosity of defined size and the molecular specificity gained therefrom, molecular sieves often find particular utility in adsorption, ion-exchange, gas separation, and catalyst applications.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a unique three-letter code. The various molecular sieve framework structures recognized by the Structure Commission of the International Zeolite Association are maintained in a structural database accessible at http://www.iza-structure.org/databases.

SSZ-60 is a molecular sieve material which possesses a unique one-dimensional channel system with pores delimited by twelve-rings. The structure of SSZ-60 may be derived from a modification of the framework of ZSM-23 (MTT), which possesses one-dimensional 10-ring pores. The framework structure of SSZ-60 has been assigned the three-letter code SSY by the Structure Commission of the International Zeolite Association.

The composition and characterizing X-ray diffraction pattern of SSZ-60 are disclosed in U.S. Pat. No. 6,620,401, which also describes the synthesis of the molecular sieve in the presence of a structure directing agent comprising N-ethyl-N-(3,3,5-trimethylcyclohexyl)pyrrolidinium cations or N-ethyl-N-(2,4,4-trimethylcyclopentyl)pyrrolidinium cations.

SSZ-60 is typically prepared directly as a borosilicate. Borosilicate molecular sieves, however, are not sufficiently catalytically active to be practicable for certain hydrocarbon conversion processes. Substitution of aluminum for boron in the molecular sieve framework via post-synthetic treatment methods can enhance the catalytic activity of the molecular sieve.

According to the present disclosure, methods are provided for the direct synthesis of aluminosilicate SSZ-60 (Al-SSZ-60), thereby avoiding an extra post-synthetic treatment step. In addition, the crystallographic T-site location of framework aluminum atoms in Al-SSZ-60 materials using the direct methods described herein may differ from aluminum-containing SSZ-60 materials prepared by conventional post-synthetic aluminum-exchange methods.

SUMMARY

In one aspect, there is provided a method of synthesizing an aluminosilicate molecular sieve having an SSY framework, the method comprising: (1) preparing a reaction mixture comprising: (a) a source of aluminum and silicon, where the source of both aluminum and silicon is an aluminosilicate zeolite having an FAU framework; (b) a structure directing agent [Q] comprising N-ethyl-N-(3,3,5-trimethylcyclohexyl)pyrrolidinium cations, and/or N-ethyl-N-(2,4,4-trimethylcyclopentyl)pyrrolidinium cations; (c) a source of an alkali metal [M]; (d) a source of hydroxide ions; (e) seed crystals; and (f) water; and (2) subjecting the reaction mixture to crystallization conditions sufficient to form crystals of the aluminosilicate molecular sieve.

In another aspect, there is provided an aluminosilicate molecular sieve having an SSY framework, and in its as-made form, having within its pore structure N-ethyl-N-(3,3,5-trimethylcyclohexyl)pyrrolidinium cations and/or N-ethyl-N-(2,4,4-trimethylcyclopentyl)pyrrolidinium cations.

DETAILED DESCRIPTION

Glossary

Figure 1:
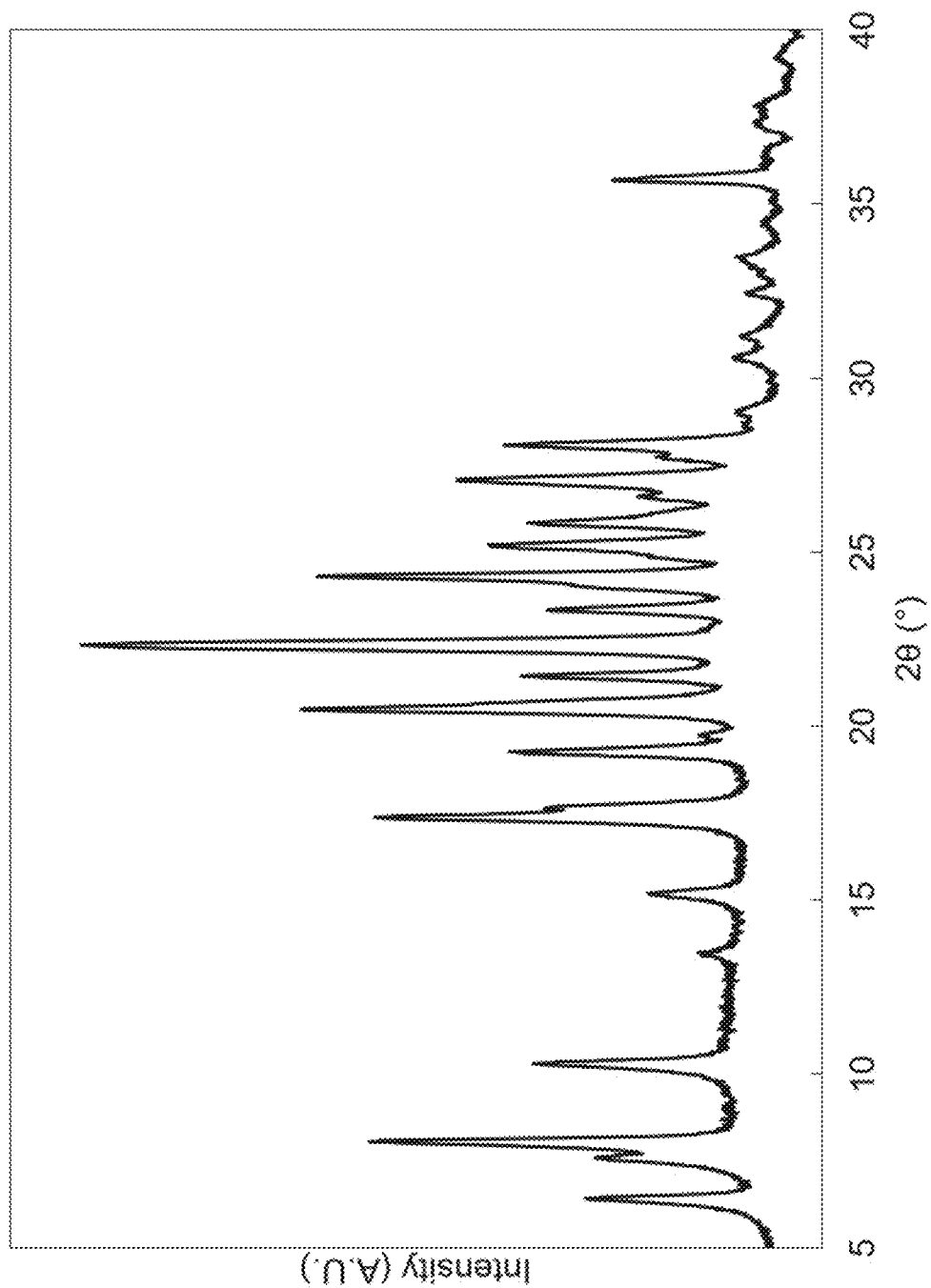
FIG. 1 shows a powder X-ray diffraction (XRD) pattern of the as-made product of Example 3.
Figure 2:
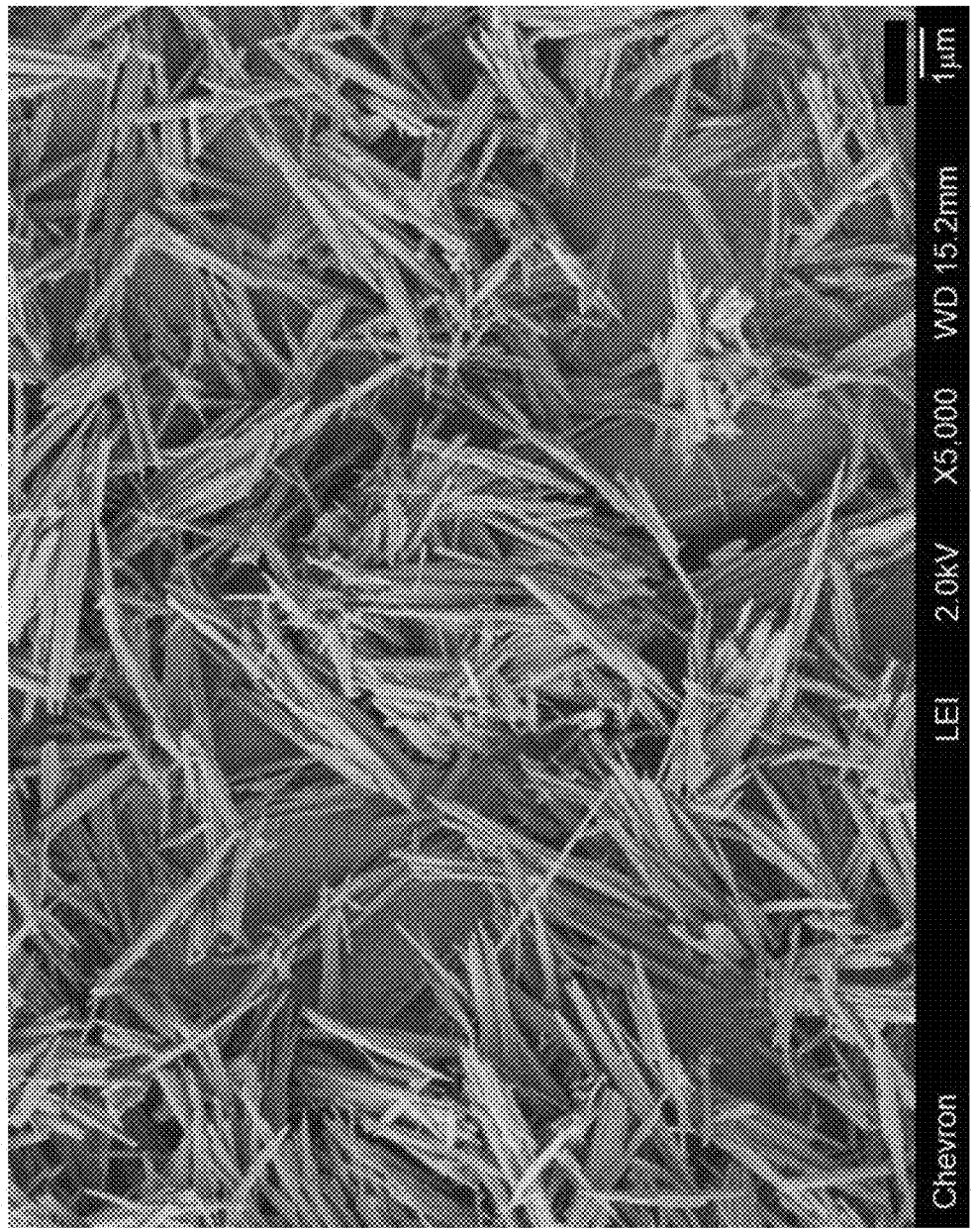
FIG. 2 shows a Scanning Electron Microscopy (SEM) image of the as-made product of Example 3.

The term "SSY" refers to an SSY type topology or framework as recognized by the International Zeolite Association (IZA) Structure Commission.

The term "FAU" refers to an FAU type framework as recognized by the IZA Structure Commission and the term "FAU zeolite" means an aluminosilicate in which the primary crystalline phase is FAU.

Reaction Mixture

In general, an aluminosilicate molecular sieve having an SSY framework may be synthesized by: (1) preparing a reaction mixture comprising: (a) a source of aluminum and silicon, where the source of both aluminum and silicon is an aluminosilicate zeolite having an FAU framework; (b) a structure directing agent [Q] comprising N-ethyl-N-(3,3,5-trimethylcyclohexyl) pyrrolidinium cations, and/or N-ethyl-N-(2,4,4-trimethylcyclopentyl)pyrrolidinium cations; (c) a source of an alkali metal [M]; (d) a source of hydroxide ions; (e) seed crystals; and (f) water; and (2) subjecting the reaction mixture to crystallization conditions sufficient to form crystals of the aluminosilicate molecular sieve.

The reaction mixture can have a composition, in terms of molar ratios, within the ranges shown in Table 1.

TABLE 1

| Reactants | Useful | Exemplary |
|---|---|---|
| $SiO_2/Al_2O_3$ | 20 to 200 | 30 to 100 |
| $OSDA/SiO_2$ | 0.05 to 0.50 | 0.15 to 0.40 |
| $M/SiO_2$ | 0.10 to 0.80 | 0.20 to 0.50 |
| $OH/SiO_2$ | 0.10 to 1.0 | 0.20 to 0.80 |
| $H_2O/SiO_2$ | 10 to 80 | 15 to 50 |

The aluminosilicate zeolite having an FAU framework can be single type of FAU zeolite or a mixture of two or more FAU zeolites. The FAU zeolite can be a zeolite Y. The FAU zeolite can be two or more Y-zeolites having different silica-to-alumina molar ratios.

The source of silicon and/or aluminum can further comprise one or more additional components, wherein the one or more additional components are present in an amount such that at least 80% (e.g., at least 90%, or at least 95%) of the silicon and/or aluminum is provided by the aluminosilicate zeolite having the FAU framework.

Sources of aluminum in addition to the aluminosilicate FAU zeolite can include hydrated alumina, aluminum hydroxide, alkali metal aluminates, aluminum alkoxides, water-soluble aluminum salts (e.g., aluminum nitrate), and any combination thereof.

Sources of silicon in addition to the aluminosilicate FAU zeolite can include colloidal silica, precipitated silica, fumed silica, alkali metal silicates, tetraalkyl orthosilicates (e.g., tetraethyl orthosilicate), and any combination thereof.

The alkali metal [M] can be lithium, sodium, potassium, rubidium, cesium, or any combination thereof. In some aspects, the alkali metal is sodium, potassium, or a mixture of sodium and potassium. Examples of suitable alkali metal sources include alkali metal hydroxides (e.g., sodium hydroxide, potassium hydroxide).

The structure directing agent [Q] comprises N-ethyl-N-(3,3,5-trimethylcyclohexyl)pyrrolidinium cations and/or N-ethyl-N-(2,4,4-trimethylcyclopentyl)pyrrolidinium cations, represented by the following structures (1) and (2), respectively:

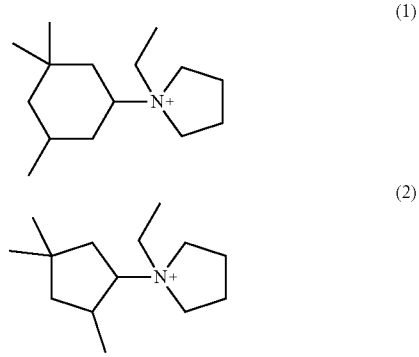

Suitable sources of Q are the hydroxide, chloride, bromide, iodide, and/or other salts of the relevant quaternary ammonium compounds.

The reaction mixture also contains seed crystals of a crystalline molecular sieve material, such as a crystalline molecular sieve having an SSY framework (e.g., borosilicate SSZ-60, aluminosilicate SSZ-60), from a previous synthesis. Preferably, in the reaction mixture, the weight ratio of the seed crystals relative to silica in the aluminosilicate FAU zeolite is in a range of from 0.001:1 to 0.2:1 (e.g., 0.005:1 to 0.15:1, or 0.01:1 to 0.1:1). Seeding can be advantageous to improve selectivity for SSY and/or to shorten the crystallization process.

The reaction mixture components can be supplied by more than one source. Also, two or more reaction mixture components can be provided by one source.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

Crystallization and Post-Synthesis Treatment

Crystallization of the molecular sieve from the reaction mixture may be carried out under static or stirred conditions in a suitable reactor vessel, such as for example, polypropylene jars or Teflon lined or stainless steel autoclaves placed in a convection oven maintained at a temperature of from 100° C. to 200° C. for a period of time sufficient for crystallization to occur (e.g., about 1 day to 21 days, or about 1 day to 14 days). In some aspects, crystallization is performed under static conditions (i.e., in the absence of any particular means of agitation during the crystallization process). Preferably, the crystallization process is carried out under autogenous pressure, preferably in an autoclave.

Once the desired molecular sieve crystals have formed, the solid product can be separated from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., 4 hours to 24 hours for oven drying at 75° C. to 150° C.), to obtain the as-made molecular sieve crystals. The drying step can be performed under vacuum or at atmospheric pressure.

As a result of the crystallization process, the recovered as-made crystalline molecular sieve product contains within its pore structure at least a portion of the structure directing agent used in the synthesis.

Part or all of the structure directing agent used during the synthesis of the as-made material may be removed by thermal treatment (e.g., calcination), ozone treatment, or other treatments to form material that is substantially free of the structure directing agent (e.g., greater than 50%, 60%, 70%, 80%, 90%, 95% or 99%, based on weight, free of structure directing agent). Calcination may be carried out in any manner conventionally known in the art, for example, the calcination temperature is generally from 300° C. to 750° C. (e.g., 400° C. to 600° C.), and the calcination duration is generally from 1 to 10 hours (e.g., 3 to 6 hours). In addition, the calcination is generally carried out in an oxygen-containing atmosphere, such as air or oxygen atmosphere.

To the extent desired, any extra-framework alkali metal cations in the as-made molecular sieve can be replaced in accordance with techniques well known in the art (e.g., by ion-exchange) with other cations. Preferred replacing cations can include metal ions, hydrogen ions, hydrogen precursor (e.g., ammonium ions), and mixtures thereof. Particularly preferred cations can include those which tailor the catalytic activity for certain hydrocarbon conversion reactions. These can include hydrogen, rare earth metals, and metals of Groups 2 to 15 of the Periodic Table of the Elements.

Characterization of the Molecular Sieve

Aluminosilicate molecular sieves produced in accordance with the methods described herein can have a $SiO_2/Al_2O_3$ molar ratio (SAR) in a range of from 20 to 200 (e.g., 20 to 150, or 20 to 100, or 20 to 75, or 30 to 200, or 30 to 150, or 30 to 100, or 30 to 75, or 40 to 200, or 40 to 150, or 40 to 100, or 40 to 75). The silica-to-alumina molar ratio of molecular sieves may be determined by conventional analysis, such as atomic absorption spectroscopy (AAS), inductively coupled plasma atomic emission spectroscopy (ICP-AES), or X-ray fluorescence (XRF).

The aluminosilicate molecular sieve can comprise at least 90%, or at least about 95%, or at least 97%, or at least 99% by weight phase-pure SSY framework, based on the total weight of the composition, as determined by powder XRD or NMR, or by other known methods for such determination. The remainder of the composition is non-SSY material which can include amorphous material, different crystalline phases, different framework types (e.g., undissolved FAU), or combinations thereof.

The powder XRD patterns presented herein were determined by standard techniques. The radiation was the K-alpha/doublet of copper. Minor variations in the diffraction pattern values can result from variations in the organic compound used in the preparation of the molecular sieve and from variations in the molar ratios of the framework species from sample to sample. Calcination can also cause minor shifts in the XRD pattern. Notwithstanding these minor perturbations, the basic crystal lattice structure remains substantially unchanged.

EXAMPLES

The following illustrative examples are intended to be non-limiting.

Example 1

Synthesis of Structure Directing Agent

The structure directing agent, N-ethyl-N-(3,3,5-trimethylcyclohexyl)pyrrolidinium hydroxide, was prepared in accordance with Example 1 of U.S. Pat. No. 6,620,401.

Example 2

Synthesis of Borosilicate SSZ-60 (B-SSZ-60)

Borosilicate SSZ-60 was prepared in accordance with Example 3 of U.S. Pat. No. 6,620,401.

Example 3

Synthesis of Aluminosilicate SSZ-60 (Al-SSZ-60)

The following components were added (in order) to a 23 mL Teflon liner: 0.89 g of deionized water, 0.27 g of an aqueous NaOH solution (50%), 6.87 g of OSDA solution from Example 1 (12%), 0.60 g of Tosoh 385HUA USY zeolite (SAR=100), and 0.06 g of as-synthesized B-SSZ-60 seed crystals from Example 2. The final molar ratio of the gel was as follows: 1 $SiO_2$/0.01 $Al_2O_3$/0.35 NaOH/0.35 OSDA/40 $H_2O$/0.1 B-SSZ-60 seeds. The liner was then capped, placed into an autoclave and heated at 160° C. under tumbling conditions (43 rpm) inside a convection oven for 7 days. The solids were then isolated by filtration, washed with deionized water, and dried in an oven at 95° C.

Analysis by powder XRD showed that the as-made product was pure-phase SSZ-60. FIG. 1 shows the powder XRD of the product.

The as-made product had a $SiO_2$/$Al_2O_3$ molar ratio of 58, as determined by inductively coupled plasma atomic emission spectroscopy (ICP-AES) elemental analysis.

Example 4

Example 3 was repeated, except that no B-SSZ-60 seed crystals were added.

Analysis by powder XRD showed that the product was a phase other than SSZ-60.

Example 5

Physicochemical Characterization of Al-SSZ-60

The as-made product of Example 3 was calcined inside a muffle furnace under a flow of air heated to 595° C. at a rate of 1° C./minute and held at 595° C. for 5 hours before the sample was allowed to cool to room temperature.

The calcined material was ion-exchanged into the ammonium form by treating the calcined molecular sieve with 10 mL (per g of molecular sieve) of a 1 N ammonium nitrate solution at 95° C. for 2 hours. The solution was cooled, decanted, and the same process repeated two times. The solids were then isolated by filtration, washed with deionized water, and dried in an oven at 95° C. The molecular sieve was subsequently converted to the proton-form by calcining the molecular sieve from ambient conditions to 500° C. at a rate of 1° C./minute and held at 500° C. for 3 hours before the sample was allowed to cool to room temperature.

The proton-form molecular sieve had a $SiO_2$/$Al_2O_3$ molar ratio of 64, as determined by ICP-AES.

Analysis of nitrogen physisorption data by the t-plot method showed that the material had a micropore volume of 0.18 $cm^3$/g, a total pore volume of 0.30 $cm^3$/g, and an external surface area of 23.83 $m^2$/g.

Analysis by n-propylamine temperature-programmed desorption showed that the molecular sieve had an acid site density of 388 μmol/g.

Example 6

Hydroconversion of n-Decane

Calcined Al-SSZ-60 product was impregnated with palladium at a loading of 0.5 wt. % using the required amount of $Pd(NH_3)_4(NO_3)_2$ dissolved in deionized water (buffered at pH=10). The exchanged molecular sieve was dried overnight at 85° C. and then calcined in air at 482° C. for 3 hours. The Pd/Al-SSZ-60 catalyst was then pelletized at 5 kpsi, crushed and sieved to 20-40 mesh.

Figure 3:
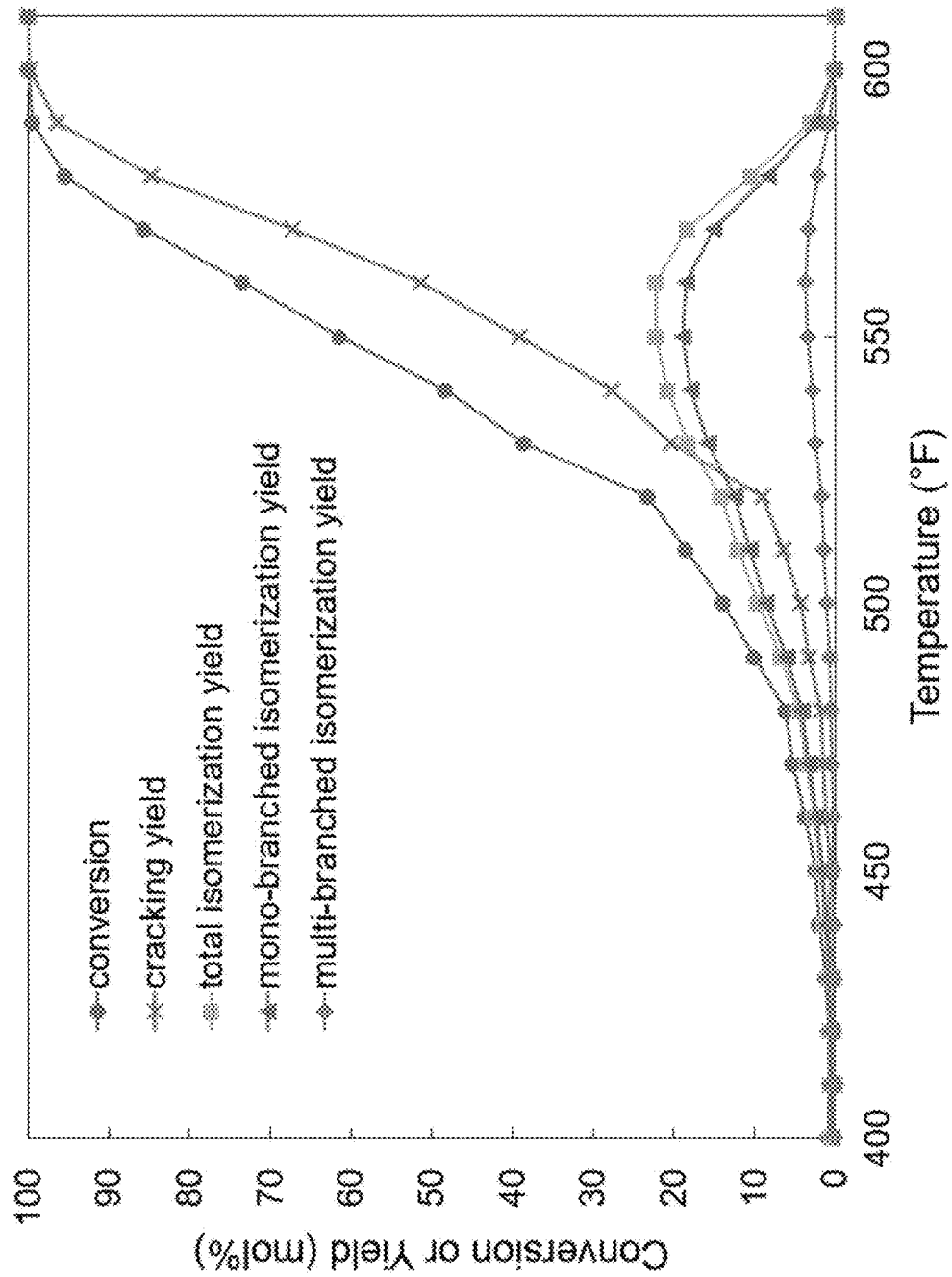
FIG. 3 is a graph illustrating conversion or yield as a function of temperature in the hydroconversion of n-decane over a Pd/Al-SSZ-60 catalyst.

For catalytic testing, 0.5 g of the Pd/Al-SSZ-60 TON catalyst (weight of the dehydrated sample as determined by thermogravimetric analysis at 600° C.) was loaded in the center of a 23 inch-long×¼ inch OD stainless steel reactor tube with alundum loaded upstream of the catalyst for preheating the feed (a total pressure of 1200 psig; a down-flow hydrogen rate of 12.5 mL/min, when measured at 1 atmosphere pressure and 25° C.; and a down-flow liquid feed rate of 1 mL/h). The catalyst was first reduced in flowing hydrogen at 315° C. for 1 hour. Catalytic testing was carried out at a temperature of from 400° F. to about 610° F. Products were analyzed by on-line capillary gas chromatography (GC) approximately once every 60 minutes. Raw data from the GC was collected by an automated data collection/processing system and hydrocarbon conversions were calculated from the raw data. Conversion is defined as the amount of n-decane reacted in mol % to produce other products (including iso-C10). Yields are expressed as mol % of products other than n-decane and include iso-C10 isomers as a yield product. The results are shown in FIG. 3.

The invention claimed is:

1. A method of synthesizing an aluminosilicate molecular sieve having an SSY framework, the method comprising:

(1) preparing a reaction mixture consisting essentially of:
  (a) a source of aluminum and silicon, where the source of both aluminum and silicon is an aluminosilicate zeolite having an FAU framework;
  (b) a structure directing agent [Q] selected from the group consisting of N-ethyl-N-(3,3,5-trimethylcyclohexyl) pyrrolidinium cations, N-ethyl-N-(2,4,4-trimethylcyclopentyl) pyrrolidinium cations, and a combination thereof;
  (c) a source of an alkali metal [M];
  (d) a source of hydroxide ions;
  (e) seed crystals; and
  (f) water; and
(2) heating the reaction mixture to obtain the aluminosilicate molecular sieve having an SSY framework.

2. The method of claim 1, wherein the reaction mixture has a composition, in terms of molar ratios, as follows:

| | |
|---|---|
| $SiO_2/Al_2O_3$ | 20 to 200 |
| $Q/SiO_2$ | 0.05 to 0.50 |
| $M/SiO_2$ | 0.10 to 0.80 |
| $OH/SiO_2$ | 0.10 to 1.00 |
| $H_2O/SiO_2$ | 10 to 80. |

3. The method of claim 1, wherein the reaction mixture has a composition, in terms of molar ratios, as follows:

| | |
|---|---|
| $SiO_2/Al_2O_3$ | 30 to 100 |
| $Q/SiO_2$ | 0.15 to 0.40 |
| $M/SiO_2$ | 0.20 to 0.50 |
| $OH/SiO_2$ | 0.20 to 0.80 |
| $H_2O/SiO_2$ | 15 to 50. |

4. The method of claim 1, wherein the aluminosilicate zeolite having the FAU framework is zeolite Y.

5. The method of claim 1, wherein the alkali metal comprises sodium, potassium, or a mixture of sodium and potassium.

6. The method of claim 1, wherein the seed crystals comprise a crystalline molecular sieve having an SSY framework.

7. The method of claim 1, wherein, in the reaction mixture, a weight ratio of the seed crystals relative to silica in the aluminosilicate zeolite having the FAU framework is in a range of from 0.001:1 to 0.2:1.

8. The method of claim 1, wherein the heating is conducted under autogenous pressure at a temperature of from 100° C. to 200° C.

* * * * *